(12) United States Patent
Yoder

(10) Patent No.: US 7,853,667 B1
(45) Date of Patent: Dec. 14, 2010

(54) EMULATION OF TRANSPARENT RECALL IN A HIERARCHICAL STORAGE MANAGEMENT SYSTEM

(75) Inventor: Alan G. Yoder, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 958 days.

(21) Appl. No.: 11/197,931

(22) Filed: Aug. 5, 2005

(51) Int. Cl.
*G06F 15/16* (2006.01)
*G06F 7/00* (2006.01)
*G06F 13/00* (2006.01)

(52) U.S. Cl. .................. 709/217; 707/604; 711/161
(58) Field of Classification Search ............. 709/217; 707/200, 201, 604; 711/161
See application file for complete search history.

(56) References Cited

U.S. PATENT DOCUMENTS

| | | | | |
|---|---|---|---|---|
| 5,564,037 | A * | 10/1996 | Lam ........................... | 711/161 |
| 5,617,566 | A * | 4/1997 | Malcolm .................... | 707/204 |
| 5,873,103 | A * | 2/1999 | Trede et al. ................. | 1/1 |
| 6,269,382 | B1 * | 7/2001 | Cabrera et al. .............. | 707/204 |
| 6,718,372 | B1 * | 4/2004 | Bober ........................ | 709/217 |
| 6,757,794 | B2 * | 6/2004 | Cabrera et al. .............. | 711/156 |
| 6,804,719 | B1 * | 10/2004 | Cabrera et al. .............. | 709/226 |
| 7,007,048 | B1 * | 2/2006 | Murray et al. .............. | 707/204 |
| 7,162,599 | B2 * | 1/2007 | Berkowitz et al. .......... | 711/162 |
| 7,546,324 | B2 * | 6/2009 | Prahlad et al. .............. | 1/1 |
| 7,765,189 | B2 * | 7/2010 | Yamakawa .................. | 707/640 |
| 2002/0056031 | A1 * | 5/2002 | Skiba et al. ................. | 711/162 |
| 2003/0004947 | A1 * | 1/2003 | Coverston ................... | 707/9 |
| 2003/0158862 | A1 * | 8/2003 | Eshel et al. ................. | 707/200 |
| 2004/0039891 | A1 * | 2/2004 | Leung et al. ................ | 711/165 |
| 2004/0078639 | A1 * | 4/2004 | Anna et al. .................. | 714/6 |
| 2005/0021566 | A1 * | 1/2005 | Mu ............................. | 707/200 |
| 2005/0033757 | A1 * | 2/2005 | Greenblatt et al. .......... | 707/100 |
| 2005/0210084 | A1 * | 9/2005 | Goldick et al. .............. | 707/205 |
| 2006/0010154 | A1 * | 1/2006 | Prahlad et al. .............. | 707/102 |
| 2006/0129537 | A1 * | 6/2006 | Torii et al. .................. | 707/3 |
| 2006/0212481 | A1 * | 9/2006 | Stacey et al. ............... | 707/104.1 |
| 2007/0016620 | A1 * | 1/2007 | Suriyanarayanan et al. . | 707/200 |
| 2007/0179990 | A1 * | 8/2007 | Zimran et al. ............... | 707/201 |
| 2008/0154988 | A1 * | 6/2008 | Shiozawa et al. ........... | 707/204 |

* cited by examiner

*Primary Examiner*—William C Vaughn, Jr.
*Assistant Examiner*—Muktesh G Gupta
(74) *Attorney, Agent, or Firm*—Blakely, Sokoloff, Taylor & Zafman LLP

(57) ABSTRACT

In at least one embodiment of the invention, a primary storage facility is managed in an HSM system. Data is relocated from the primary storage facility to a secondary storage facility. A request is received from a client for only a portion of the relocated data. In response to the request, the requested portion of the data is obtained from the secondary storage facility and stored in the primary storage facility as a sparse file. The requested portion of the data is then provided to the client from the sparse file.

17 Claims, 7 Drawing Sheets

EMULATION OF TRANSPARENT RECALL IN A HIERARCHICAL STORAGE MANAGEMENT SYSTEM

FIELD OF THE INVENTION

At least one embodiment of the present invention pertains to hierarchical storage management (HSM) systems, and more particularly, to emulation of transparent recall in an HSM system.

BACKGROUND

Various forms of network-based data storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc. A network-based storage system typically includes at least one storage server, which is a processing system configured to store and retrieve data on behalf of one or more client processing systems ("clients").

In the context of NAS, a storage server may be a file server, which is sometimes called a "filer". A filer operates on behalf of one or more clients to store and manage shared files. The files may be stored in one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with block-level access to stored data, rather than file-level access. Some storage servers are capable of providing clients with both file-level access and block-level access, such as certain Filers made by Network Appliance, Inc. of Sunnyvale, Calif. (NetApp®).

A network storage system can be configured to operate as (or in) an HSM system (hierarchical storage management system). HSM is a data storage technique in which data is automatically moved between high-cost/high-performance storage media and low-cost/lower-performance storage media. HSM was developed mainly because high-speed storage devices, such as magnetic hard disk drives, are more expensive (per byte stored) than slower devices, such as optical disks and magnetic tape. While it would be preferable to have all data available on high-speed devices at all times, that can be too expensive for many organizations. Therefore, HSM systems instead store most of the data on slower (less-expensive) devices and then copy data to faster devices on an as-needed basis. An HSM system typically monitors how data is used and makes guesses as to which data can be safely moved to slower storage devices and which data should stay on the faster storage devices.

FIG. 1 shows an example of a configuration of an HSM system at a high level. A client 1 requires access to data stored in a primary storage facility 2. The primary storage facility 2 includes the faster storage devices in the HSM system, such as magnetic hard disks. The secondary storage facility 3 provides the slower storage devices in the system, such as optical disks or magnetic tape. Movement of data between the primary storage facility and the secondary storage facility is controlled by an HSM server. Data may be communicated between the primary and secondary storage facilities directly, through the HSM server, or both.

Some HSM systems provide "transparent" remote file access to archived data, which is also called "transparent recall". This means that the data is fetched from the secondary storage facility and delivered to the requesting client without committing it to disk in the primary storage facility. This feature is particularly desirable when the client needs to read only a portion of a very large file, since otherwise, normal HSM practice would be to recall the entire file and store it in the primary storage facility.

However, transparent recall may not be practical in some HSM systems. For example, with a system such as shown in FIG. 1, the primary and secondary storage facilities often have very different architectures and protocols. These differences tend to make it difficult and/or expensive to implement true transparent recall.

SUMMARY OF THE INVENTION

In at least one embodiment of the invention, a primary storage facility is managed in an HSM system. Data is relocated from the primary storage facility to a secondary storage facility in the HSM system. A request is received from a client for only a portion of the relocated data. In response to the request, the requested portion of the data is obtained from the secondary storage facility and stored in the primary storage facility as a sparse file. The requested portion of the data is then provided to the client from the sparse file.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus to emulate transparent recall in an HSM system are described. In at least one embodiment of the invention, a storage server manages a primary storage facility in an HSM system. Data is relocated from the primary storage facility to a secondary storage facility based on usage data or other appropriate criteria. When a request is received from a client for only a portion of a file (or other data container) that has been relocated to secondary storage, the requested portion of the data is obtained from the secondary storage and stored in the primary storage as a sparse file. The requested portion of the data is then provided to the client from the sparse file. This approach has the advantage of transparent recall that the entire file (or other data container) need not be recalled from secondary storage and committed to disk in primary storage when only a portion of the data was requested by the client. For very large files, this can have a significant performance benefit. Furthermore, this approach is simpler to implement than true transparent recall, such that there is no need for the primary storage and secondary storage facilities to be architecturally similar for this purpose.

Figure 1:
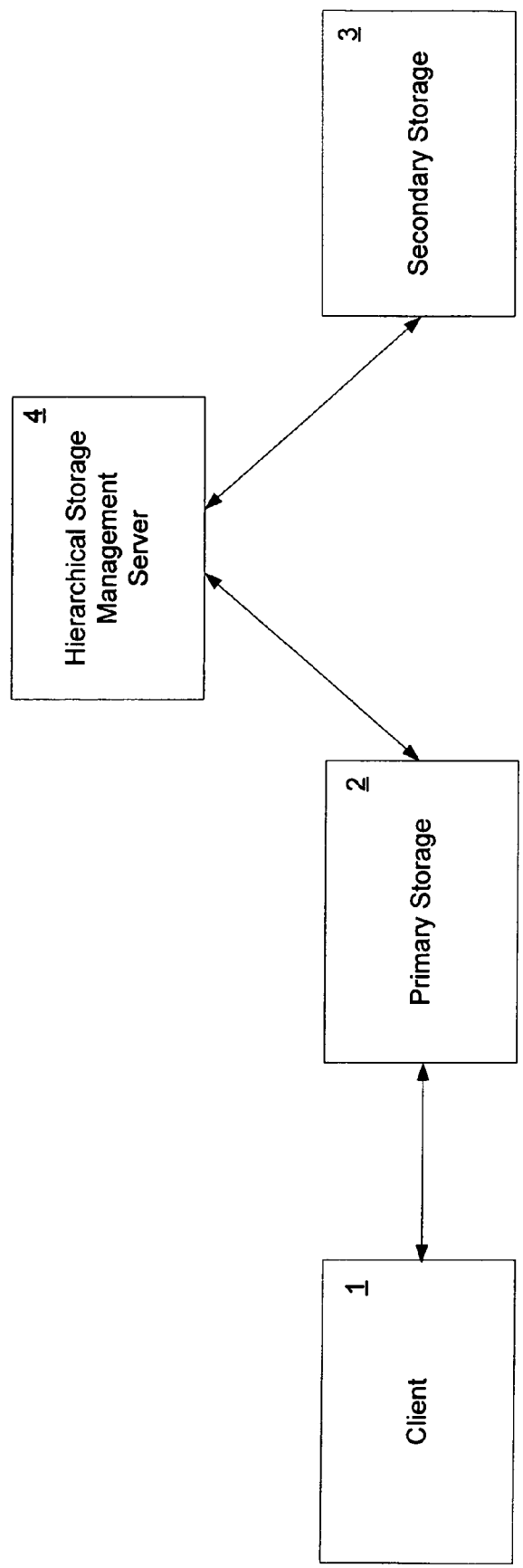
FIG. 1 is a high-level block diagram of an HSM system.
Figure 2:
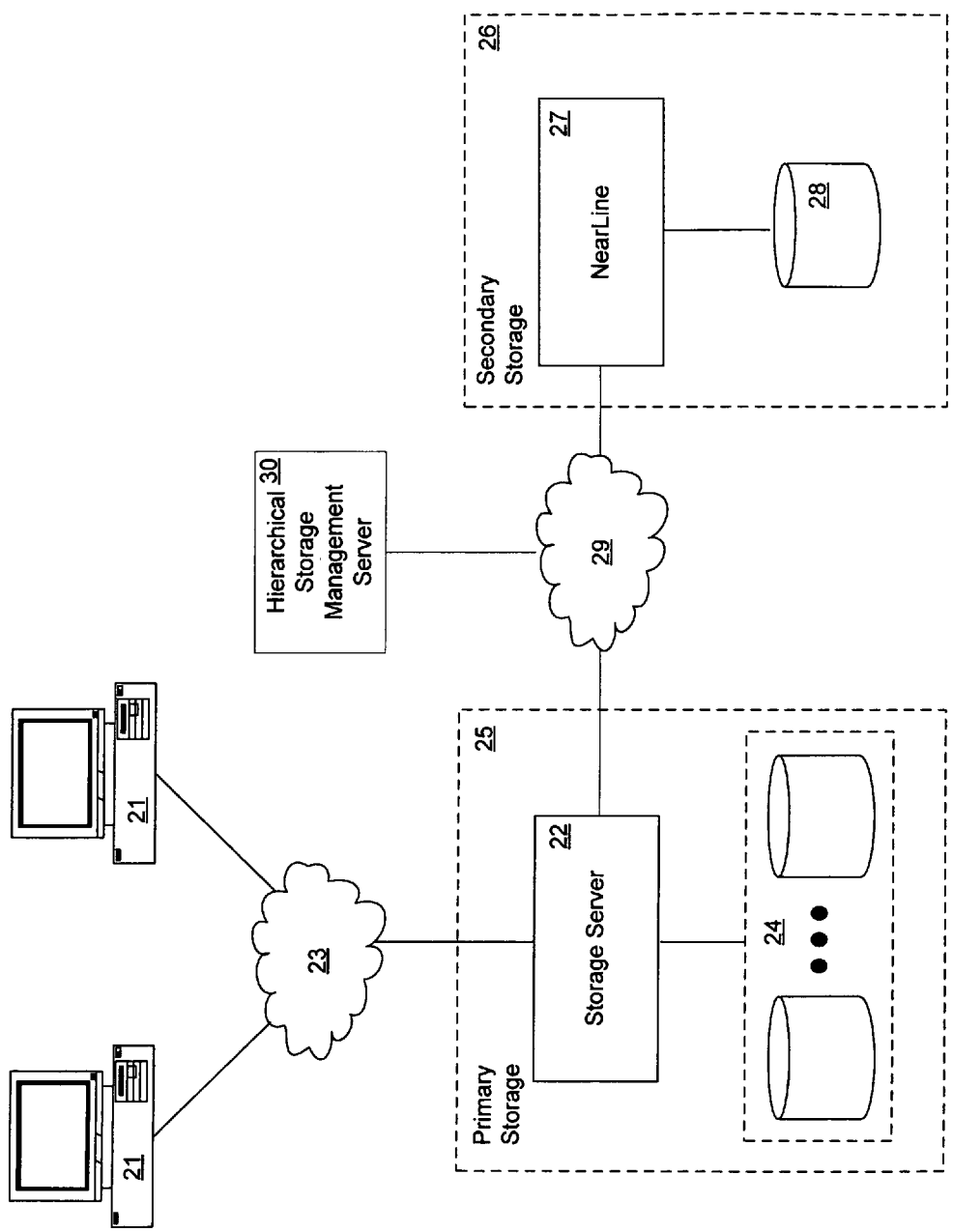
FIG. 2 shows an embodiment of an HSM system.

FIG. 2 shows a simple example of an HSM network environment in which the technique introduced here can be implemented. A primary storage facility 25 includes and is managed by a storage server 22, which can be, for example, a file server. In particular, the storage server can be a Filer from Network Appliance, Inc. (NetApp®) of Sunnyvale, Calif. Note that the technique is not limited to use in traditional file servers. For example, the technique can be adapted for use in other types of storage systems, such as storage servers which provide clients with block-level access to stored data or processing systems other than storage servers.

The primary storage facility 25 also includes a set of mass storage devices 24 coupled to the storage server 22. The set of mass storage devices 24 may include one or more RAID (redundant array of inexpensive disks) redundancy groups. The storage server 22 also is coupled to a set of storage clients 21 (hereinafter simply "clients") through a network 23, which may be a local area network (LAN), a wide area network (WAN), a global area network (GAN) such as the Internet, or a combination of such networks. Each of the clients 21 may be, for example, a conventional personal computer (PC), workstation, or the like.

The primary storage facility 25 is managed by the storage server 22. The storage server 22 receives and responds to various read and write requests from the clients 21, directed to data stored in (or to be stored in) the primary storage facility 25. The mass storage devices 24 may be, for example, conventional magnetic hard disks.

Any of the storage server 22, the HSM server 30 and/or the NearLine device 277 may have a distributed architecture. For example, any of these devices may include a separate N-("network") blade and D-(disk) blade (not shown). With respect to the storage server 22 in such an embodiment, the N-blade is used to communicate with clients 1, while the D-blade includes the file system functionality and is used to communicate with the mass storage devices 24. The N-blade and D-blade may communicate with each other using a special-purpose protocol. Alternatively, the storage server 22 may have an integrated architecture, where the network and data components are all contained in a single box. The storage server 22 further may be coupled through a switching fabric to other similar storage servers (not shown) which have their own local storage subsystems. In this way, all of the storage subsystems can form a single storage pool, to which any client of any of the storage servers has access.

The primary storage facility 25 is coupled to a secondary storage facility 26 through a network 29. Network 29 can be the same network as network 23, although not necessarily. In the illustrated embodiment, the secondary storage facility 26 includes a NearLine storage device 27, which can be a NearStore® device from NetApp®, and one or more associated mass storage media 28, such as optical disks and or magnetic tapes.

The movement of data between the primary and secondary storage facilities 25 and 26 is controlled by an HSM server 30 coupled to network 29. As such, the secondary storage facility 26 is not directly managed by the storage server 22, although the storage server 22 can communicate directly with the NearLine storage device 27. Note that while the HSM server 30 is shown as a separate entity, it could instead be implemented as a component of the storage server 22, the NearLine storage device 27, or some other network entity.

For purposes of the present invention, the process of relocating data from the primary storage facility 25 to the secondary storage facility 26 can be done the same way as in conventional HSM systems. However, the process of recalling data from secondary storage 26 to primary storage 25 in response to client requests is done differently.

In particular, embodiments of the invention emulate transparent recall by using the "sparse files" feature provided by (for example) Microsoft Windows or network file system (NFS), to store (temporarily) recalled files in the primary storage facility. Most file systems organize their files as a (not necessarily contiguous) sequence of disk blocks. If one of these blocks consists entirely of null bytes (e.g., zeroes), there is no need to allocate a corresponding block for it on disk. The term "sparse file" generally refers to a file that contains large sections of null data interspersed with meaningful data.

Figure 3:
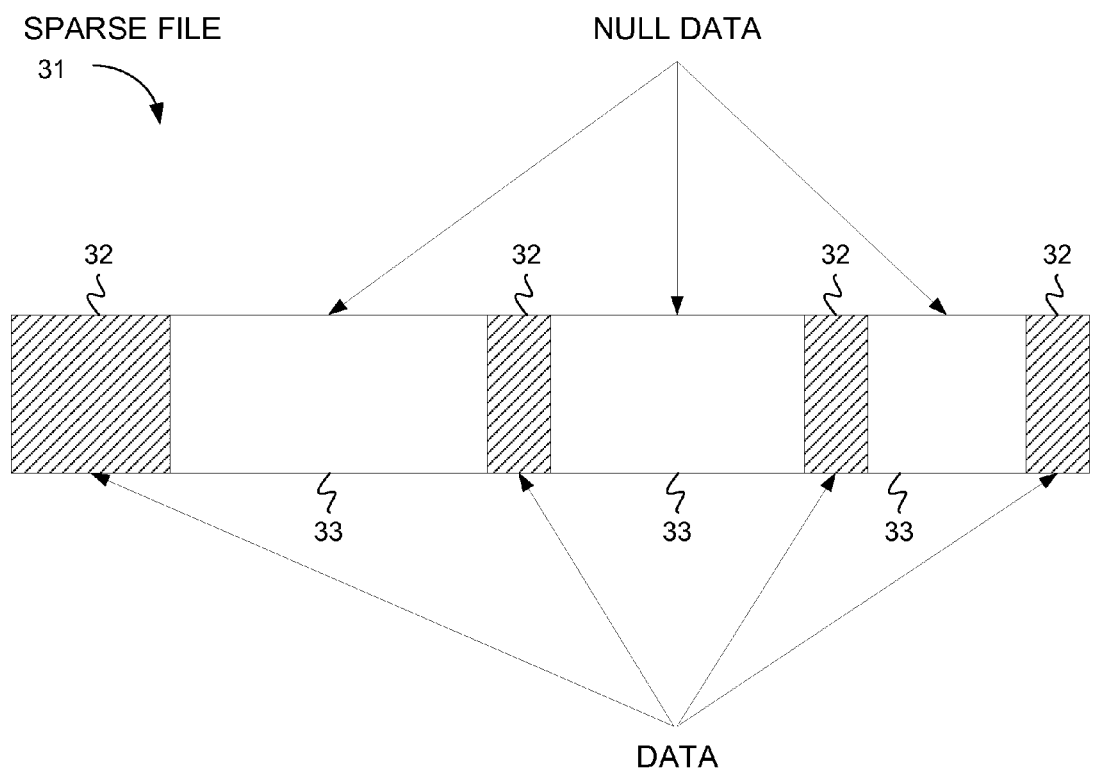
FIG. 3 shows a sparse file.

FIG. 3 illustrates an example of sparse file. The shaded portions 32 represent meaningful data in the file 31, while the unshaded portions 33 represent null data. If, for example, the entire file 31 is 15 GBytes in length but the meaningful data comprises only 5 GBytes, the file 31 may be considered a sparse file. As such, there will be a large amount of wasted disk space if all blocks of the file 31 are allocated on disk.

To address this problem, both NFS and Microsoft Windows operating systems provide facilities to reduce the amount of disk space consumed by sparse files. Windows NT, for example, provides a facility for sparse files through the Windows NT file system (NTFS) environment. Therefore, the file 31, after being designated as a sparse file using NTFS or NFS, consumes only 5 GBytes on disk.

Figure 4A:
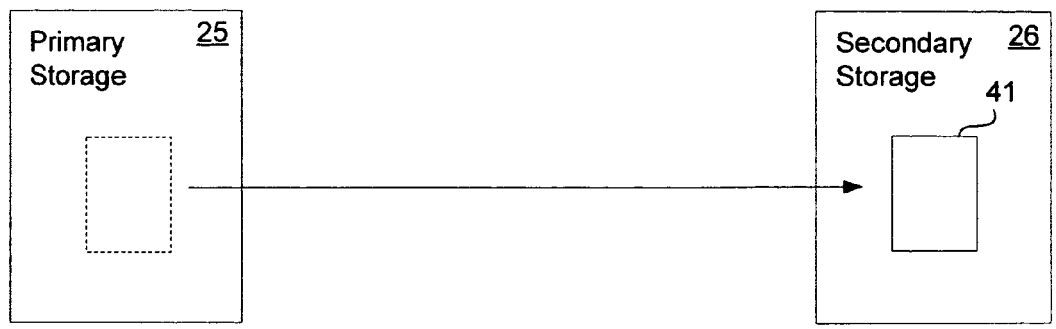
FIGS. 4A through 4G schematically illustrate stages of a process for emulating transparent recall in response to a client request for a file.
Figure 4B:
Figure 4C:
Figure 4D:
Figure 4E:
Figure 4F:
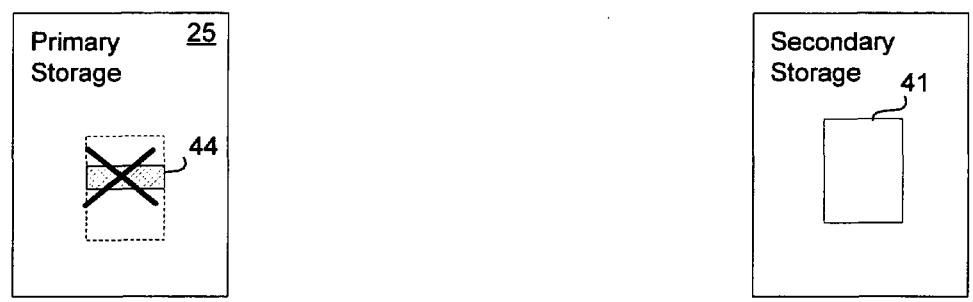
Figure 4G:
Figure 5:
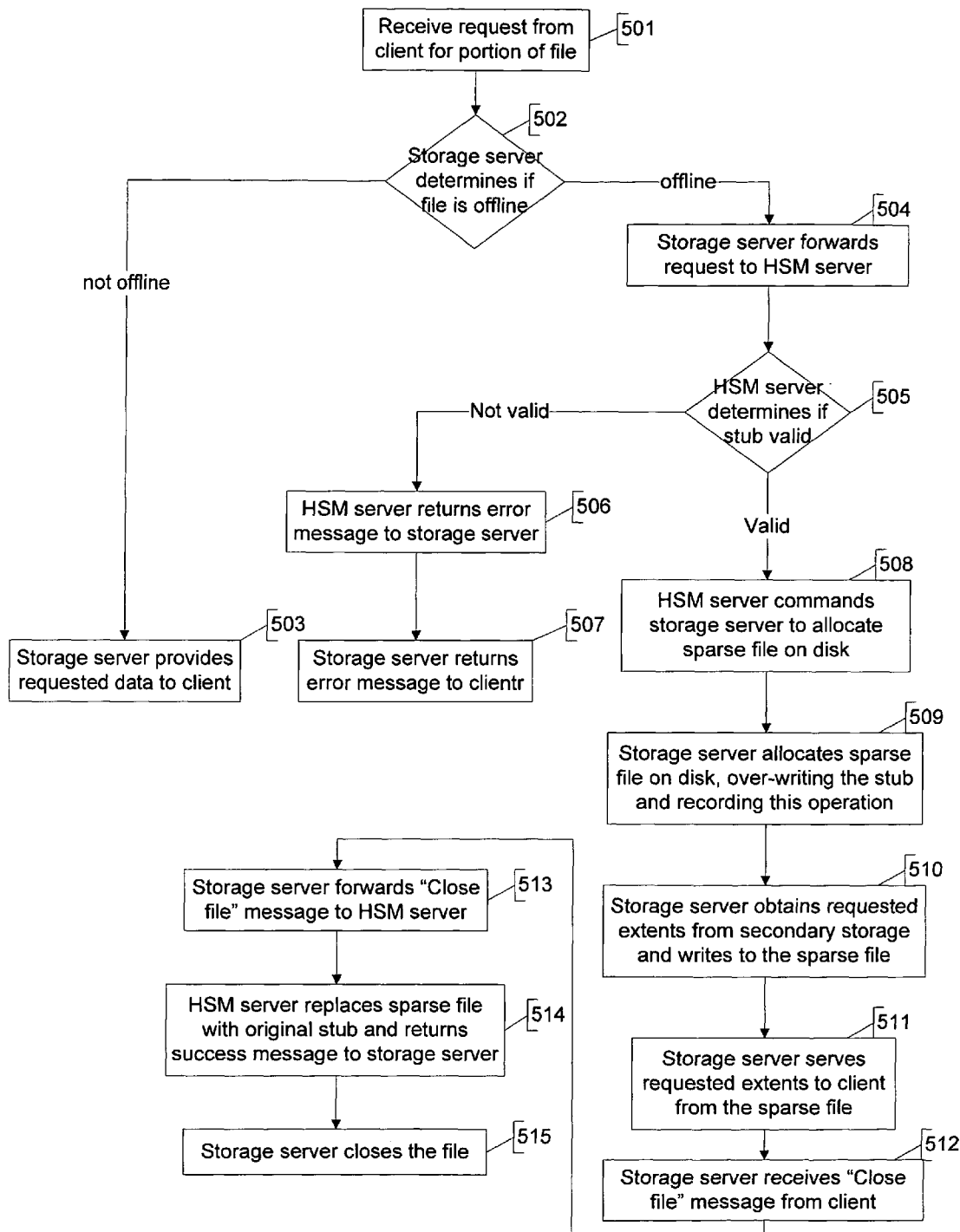
FIG. 5 is a flow diagram illustrating the process of FIG. 4.

Referring now to FIGS. 4 and 5, a process for emulating transparent recall will now be described in greater detail, according to an embodiment of the invention. When a file 41 is "offlined" (removed from the primary storage facility 25) to the secondary storage facility 26 (FIG. 4A), the HSM server 30 replaces it with a "stub" 42 on disk in the primary storage facility 25 (FIG. 4B). The stub 42 is a very small file that contains only metadata sufficient to identify the actual file 41 that it represents (e.g., file name, size, etc.) and to enable another entity, such as the HSM server 30, to determine where the actual file 41 is stored.

Subsequently, the storage server 22 receives a request at 501 (FIG. 5) from a client 21 to read only a portion of the file 41. The request may be in, for example, Common Internet File System (CIFS) protocol or Network File System (NFS) protocol. The request specifies the name of the file 41 and the extents (i.e., starting offset and total number of bytes to be read) identifying the portion of the file 41 which the client wants to read. The storage server 22 then determines at 502 whether the file is offline (i.e., in secondary storage 26). If the file is not offline (i.e., the file is in primary storage 25), then at 503 the storage server 22 reads the requested portion of the file and sends it to client in response to the client's request.

If the file is offline, then the storage server 22 then passes the request to the HSM server 30 at 504. Communication between the storage server 22 and the HSM server 30 may be done by using, for example, a remote procedure call (RPC), such as distributed computing environment/remote procedure call (DCE/RPC). The HSM server 30 then determines at 505 whether the stub is valid. This operation may verify that, for example, the stub was created by the HSM server 30 and has not been altered and/or corrupted.

If the stub is not valid, then at 506 the HSM server 30 returns an appropriate error message to the storage server 22, and in response, the storage server 22 returns a corresponding error message to the client at 507.

If the HSM server 30 determines that the stub is valid at 505, then the process proceeds as follows. First, at 508 the HSM server 30 commands the storage server 22 to allocate a sparse file on disk in the primary storage facility 25. The storage server 22 does so at 509, using (for example) the NTFS or NFS features for creating sparse files. In doing so, the storage server 22 overwrites the stub 42 that represented the requested file 41 (FIG. 4C) and records in a designated list to the fact that the stub 42 has been replaced. Next, at 510 the storage server 22 obtains the requested extents of the file 41 from the secondary storage facility 26 and then writes this data to the requested offset in the sparse file 44 on disk in the primary storage facility 25 (FIG. 4D). The storage server 22 then reads the requested extents from the sparse file 44 in its native file system mode and serves that data back to the client at 511 (FIG. 4E).

Once the client has received the data it requested, it may send a "close file" message to the storage server 22, assuming, for example, that the client and storage server 22 both implement CIFS. If so, the storage server 22 receives this message at 512. In response, the storage server 22 forwards the "close file" message to the HSM server 30 at 513. At 514 the HSM server 30 responds the message by replacing the sparse file 44 in the primary storage 25 with the original stub 42 that represented the offline file 41 (FIGS. 4F and 4G) and returning a success message to the storage server 22. The storage server 22 then closes the file at 515, causing all locks on the file to be released.

If the client and storage server 22 do not both implement CIFS, then operation 512 is omitted, and operations 513 through 514 can be done by a garbage collection process either immediately after sending the data to the client or at some later point in time.

Thus, while some data is committed back to disk in the primary storage facility 25 during this process (unlike true transparent recall), it is only the requested portion of the file that is stored, and it is only stored there for brief period of time (i.e., until the file is closed or a garbage collection process is performed).

It should be noted that the above-mentioned techniques could also be implemented in similar manner in a system with multiple storage servers 22 and/or multiple HSM servers 30.

Figure 6:
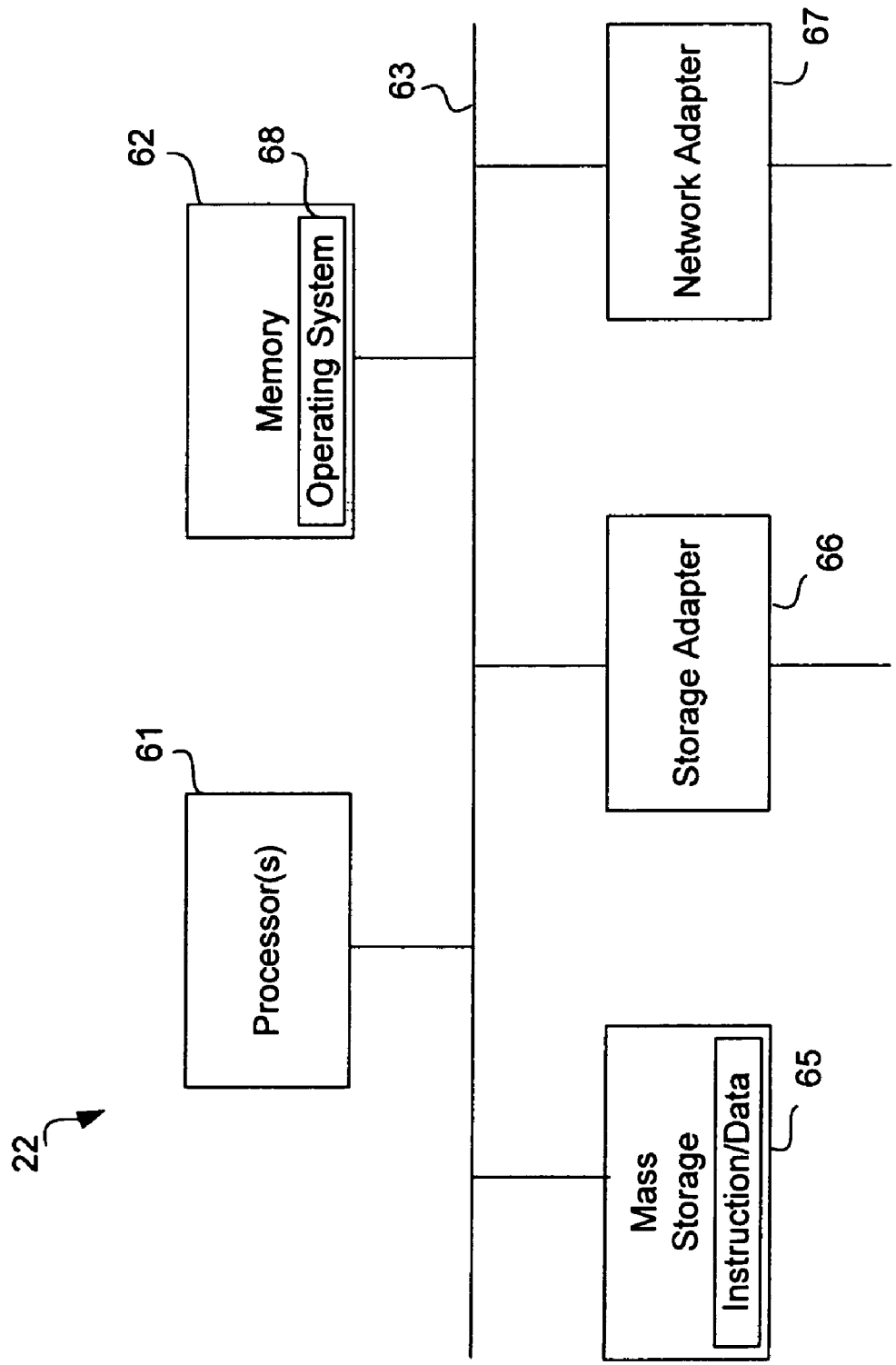
FIG. 6 is a high-level block diagram of the storage server.

FIG. 6 is a high-level block diagram showing the architecture of the storage server 22, according to certain embodiments of the invention. Certain standard and well-known components which are not germane to the present invention are not shown. The storage server 22 includes one or more processors 61 and memory 62 coupled to a bus system 63. The bus system 63 shown in FIG. 6 is an abstraction that represents any one or more separate physical buses and/or point-to-point connections, connected by appropriate bridges, adapters and/or controllers. The bus system 63, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 61 are the central processing units (CPUs) of the storage server 22 and, thus, control the overall operation of the storage server 22. In certain embodiments, the processors 61 accomplish this by executing software stored in memory 62. A processor 61 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 62 is or includes the main memory of the storage server 2. Memory 62 represents any form of random access memory (RAM), read-only memory (ROM), flash memory, or the like, or a combination of such devices. Memory 62 stores, among other things, the operating system 68 of the storage server 22, in which at least a portion of the technique introduced above can be implemented.

Also connected to the processors 61 through the bus system 63 are one or more internal mass storage devices 65, a storage adapter 66 and a network adapter 67. Internal mass storage devices 65 may be or include any conventional medium for storing large volumes of data in a non-volatile manner, such as one or more magnetic or optical based disks. The storage adapter 66 allows the storage server 22 to access the mass storage device 24 (FIG. 2) and may be, for example, a Fibre Channel adapter or a SCSI adapter. The network adapter 67 provides the storage server 22 with the ability to communicate with remote devices, such as the clients 21, over a network and may be, for example, an Ethernet adapter or Fibre Channel adapter.

The HSM server 30, any of the clients 21, and/or the NearLine storage device 27 each may also have a similar architecture to that shown in FIG. 6 (at least at a high level), subject to modifications that will be readily apparent to those skilled in the art.

Thus, a method and apparatus to emulate transparent recall in an HSM system have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   managing a primary storage facility in a hierarchical storage management (HSM) system;
   relocating data from the primary storage facility to a secondary storage facility in the HSM system;
   receiving, by the primary storage facility, a request from a client for only a portion of the relocated data, the portion comprising less than the entire relocated data; and
   responding to the request by
      obtaining, by the primary storage facility, only the requested portion of the relocated data from the secondary storage facility, wherein a non-requested portion of the relocated data remains in the secondary storage facility,
      allocating a sparse file on disk in the primary storage facility in response to obtaining the requested portion of the relocated data,
      storing the requested portion of the relocated data in the primary storage facility in the sparse file, and
      providing the requested portion of the relocated data to the client from the sparse file.

2. A method as recited in claim 1, wherein the primary storage facility comprises a plurality of mass storage devices.

3. A method as recited in claim 1, wherein the primary storage facility comprises a storage server, and wherein the secondary storage facility is not directly managed by the storage server.

4. A method as recited in claim 1, wherein the secondary storage facility comprises a NearLine storage facility.

5. A method as recited in claim 1, wherein:
the primary storage facility comprises a storage server;
the primary storage facility comprises a plurality of mass storage devices;
the secondary storage facility comprises a NearLine storage facility which is not directly managed by the storage server.

6. A method as recited in claim 1, further comprising:
maintaining at the primary storage facility a stub representing the data when the data has been relocated to the secondary storage facility;
wherein storing the requested portion of the relocated data in the primary storage facility as a sparse file comprises replacing the stub with the sparse file.

7. A method as recited in claim 6, further comprising:
replacing the sparse file in the primary storage facility with a stub representing the relocated data after providing the requested portion to said one of the clients.

8. A method as recited in claim 1, wherein the storage server includes a main memory and the primary storage facility includes a plurality of non-volatile storage devices, and wherein replacing the stub in the primary storage facility with the requested portion of the relocated data as a sparse file comprises storing the sparse file in at least one of the non-volatile storage devices.

9. A method as recited in claim 8, wherein servicing the request does not include storing the requested portion of the relocated data in the main memory of the storage server.

10. A method of operating a storage server in hierarchical storage management (HSM) system, the method comprising:
operating the storage server to store data on behalf of a plurality of clients;
using an HSM server to relocate the data from a primary storage facility managed by the storage server to a NearLine storage facility, wherein the primary storage facility includes a plurality of mass storage devices;
maintaining at the storage server a stub representing the relocated data;
receiving from one of the clients a request for only a portion of the relocated data, the portion comprising less than the entire relocated data; and
servicing the request by
reading only the requested portion of the relocated data from the NearLine storage facility, wherein a non-requested portion of the relocated data remains in the NearLine storage facility,
allocating a sparse file on disk in the storage server in response to reading the requested portion of the relocated data,
replacing the stub with the requested portion of the relocated data as a in the sparse file,
providing the requested portion of the relocated data from the storage server to said one of the clients from the sparse file, and
replacing the sparse file in the storage server with a stub representing the relocated data.

11. A method as recited in claim 10, wherein the storage server includes a main memory and uses a non-volatile storage facility to store data on behalf of the clients, and wherein replacing the stub in the storage server with the requested portion of the relocated data as a sparse file comprises storing the sparse file in the non-volatile storage facility.

12. A method as recited in claim 11, wherein servicing the request does not include storing the requested portion of the relocated data in the main memory of the storage server.

13. A storage server to operate in hierarchical storage management (HSM) system, the storage server comprising:
a processor;
a network interface through which to receive data access requests from a plurality of clients and through to provide requested data to the clients;
a storage interface through which to access a plurality of mass storage devices in a primary storage facility of the HSM system, in response to requests from the clients; and
a memory storing a file system to manage files stored in the primary storage facility, the memory further storing instructions for execution by the processor to cause the storage server to:
relocate a file from the primary storage facility to a secondary storage facility in the HSM system, wherein the secondary storage facility is not directly managed by the storage server; and
respond to a request for a portion of the relocated file from a client by allocating a sparse file on disk in the primary storage facility in response to obtaining the requested portion of the relocated data, storing only the requested portion of the relocated file in the primary storage facility in the sparse file and providing the requested portion of the relocated file from the storage server to the client from the sparse file, wherein the portion comprises less than the entire relocated file and a non-requested portion of the relocated file remains in secondary storage facility.

14. A storage server as recited in claim 13, wherein the secondary storage facility comprises a NearLine storage device.

15. A storage server as recited in claim 13, further comprising:
maintaining at the storage server a stub representing the file when the file has been relocated to the secondary storage facility;
wherein storing the requested portion of the relocated file in the primary storage facility as a sparse file comprises replacing the stub with the sparse file.

16. A storage server as recited in claim 15, further comprising:
replacing the sparse file with a stub representing the relocated file after providing the requested portion of the relocated file to the client.

17. A storage server as recited in claim 13, wherein the storage server comprises a main memory, and wherein said storing the requested portion of the relocated file in the primary storage facility as a sparse file does not include storing the requested portion of the relocated file in the main memory.

* * * * *